United States Patent
Tucker

(10) Patent No.: US 10,844,862 B2
(45) Date of Patent: Nov. 24, 2020

(54) SELF-SENSING PARALLEL CONTROL OF PUMPS

(71) Applicant: Taco, Inc., Cranston, RI (US)

(72) Inventor: Andrew Tucker, Pawtucket, RI (US)

(73) Assignee: Taco, Inc., Cranston, RI (US)

( * ) Notice: Subject to any disclaimer, the term of this patent is extended or adjusted under 35 U.S.C. 154(b) by 7 days.

(21) Appl. No.: 16/025,838

(22) Filed: Jul. 2, 2018

(65) Prior Publication Data

US 2019/0024666 A1    Jan. 24, 2019

Related U.S. Application Data

(60) Provisional application No. 62/527,703, filed on Jun. 30, 2017.

(51) Int. Cl.
*F04D 15/00* (2006.01)
*F04D 13/14* (2006.01)
(Continued)

(52) U.S. Cl.
CPC .......... *F04D 15/0066* (2013.01); *E03B 5/025* (2013.01); *F04D 13/06* (2013.01);
(Continued)

(58) Field of Classification Search
CPC .......... E03B 5/025; F04D 13/06; F04D 13/14; F04D 15/0066; F04D 15/0254; F04D 15/029; G05B 19/042; G05B 2219/2614
See application file for complete search history.

(56) References Cited

U.S. PATENT DOCUMENTS 6,185,946 B1 * 2/2001 Hartman ............... F04D 15/029
62/175
6,481,973 B1 * 11/2002 Struthers ............... F04D 7/045
417/36
(Continued)

FOREIGN PATENT DOCUMENTS

DE        102014222962 A1     5/2016
EP           0864755 A2       9/1998

*Primary Examiner* — Ronald D Hartman, Jr.
(74) *Attorney, Agent, or Firm* — Sutton Magidoff Barkume LLP

(57) ABSTRACT

A hydraulic pumping system for pumping a flow of aqueous liquid, for HVAC and potable water systems, through a plurality of hydraulic pump assemblies and mating branching feeder pipes extending between a main inlet pipe and a main outlet pipe for outputting the total flow of water, each of said pump assemblies in operative association with a mating feeder pipe to control aqueous liquid flow through said associated feeder pipe, wherein each of the hydraulic pump assemblies comprises an electric motor, mechanically coupled to a centrifugal pump and a variable frequency drive (VFD) electrically coupled to the motor. A controller is electrically coupled via a communication channel to the VFD of each of the hydraulic pump assemblies, the controller comprising a programmable device programmed to control the speed of each of the motors via the connected VFD. The controller receives data from each of the VFDs, said data comprising the amount of electrical power consumed by the VFD, the speed of the associated motor, an estimation of aqueous liquid flow, and an estimation of head, and calculates the total aqueous liquid flow through the plurality of pump assemblies, and the total system head, so that the controller can vary the speed of each VFD to adjust the total system with respect to the desired system head.

6 Claims, 9 Drawing Sheets

(51) Int. Cl.
    *F04D 15/02*    (2006.01)
    *F04D 13/06*    (2006.01)
    *G05B 19/042*   (2006.01)
    *E03B 5/02*     (2006.01)

(52) U.S. Cl.
    CPC ........... *F04D 13/14* (2013.01); *F04D 15/029* (2013.01); *F04D 15/0254* (2013.01); *G05B 19/042* (2013.01); *G05B 2219/2614* (2013.01)

(56)               References Cited

U.S. PATENT DOCUMENTS

| | | | |
|---|---|---|---|
| 7,668,694 B2* | 2/2010 | Anderson | F04D 15/0066 702/182 |
| 9,091,259 B2 | 7/2015 | Tamminen et al. | |
| 9,816,509 B2 | 11/2017 | Blaumann et al. | |
| 2010/0254825 A1* | 10/2010 | Stiles, Jr. | F04B 49/20 417/20 |
| 2015/0300358 A1* | 10/2015 | Stiles, Jr. | F04B 49/22 417/43 |
| 2016/0076549 A1* | 3/2016 | Kelly | F04D 15/0088 700/282 |
| 2016/0153456 A1* | 6/2016 | Stiles, Jr. | F04B 49/103 417/44.1 |
| 2018/0003180 A1* | 1/2018 | Raghavachari | F04D 15/0005 |

* cited by examiner

SELF-SENSING PARALLEL CONTROL OF PUMPS

BACKGROUND

Energy efficiency is an important aspect on the control of HVAC systems, in which electrical energy is supplied from the grid and turned into hydraulic power by a pump/motor combination. In the past, these motors were run at a single speed, regardless of the flow requirement. Variable frequency drives (VFDs) are now used in order to run circulating pumps at an optimal speed in order to supply enough flow to the system while using a minimum amount of energy. Since the demands of some HVAC systems can vary greatly, it can be cost effective to put two or more pumps in parallel into the same system. In this type of situation one pump will run for most of the time, but a second pump will turn on when the flow demand exceeds a threshold. If demand increases past a further threshold a third pump (if available) will turn on, and so on for as many pumps as are available.

There are various ways to stage on the second pump. One such way is based on speed, in which the second pump is turned on when the maximum speed of the initial pump has been reached or a predefined speed setpoint. This method, however, does not address the issue of energy efficiency. Another method would be to switch pumps based on wire to liquid energy efficiency. This method is better than the speed-based method, but only looks at electrical power in and mechanical power out. This method therefore doesn't take into account changes in the system that may occur when the second pump is started.

As stated above, these systems use VFD's, which are complex electronic systems that have a programmable memory to execute previously written sets of instructions. In these sets of instructions is programmed the ability to estimate certain parameters about the hydraulic flow system solely from internal electrical parameters of the motor, without external data input. By using these estimated parameters, the system may be referred to as a sensorless system.

SUMMARY OF THE INVENTION

This invention is broadly directed to improvements in the control of HVAC systems, in which electrical energy is supplied from the grid and turned into hydraulic power by a pump/motor combination for the pumping of the aqueous liquid carrying heat energy for an HVAC system. This same concept can be used for potable water, as well as for the heating or cooling liquid in HVAC systems, in for example, high rise residential buildings where water usage can vary widely, depending upon the time of day and exterior temperature. In those situations where the flow variation is great, the use of more than one pumps, controlled in accordance with the present invention, can result in great savings in electrical power usage, by timing the entry and flow rate of the several pumps.

DETAILED DESCRIPTION OF THE PREFERRED EMBODIMENT

Figure 1:
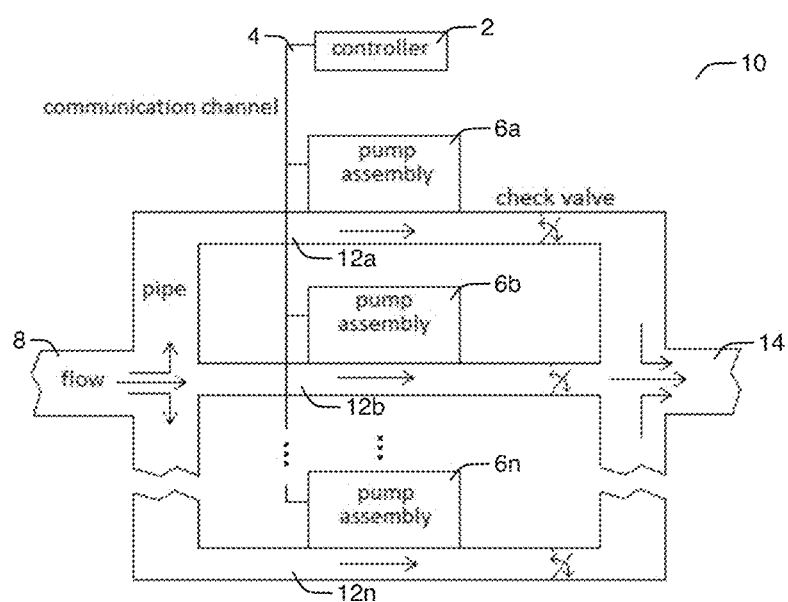
FIG. 1 is a block diagram of a system of the preferred embodiment that uses multiple pump assemblies.

With reference to FIG. 1, a block diagram is shown of a system 10 of the preferred embodiment. The system 10 includes a controller 2 that is in electrical communication via a communication channel 4 with multiple pump assemblies, which are shown herein as pump assembly 6a, pump assembly 6b, through pump assembly 6n (referred to generically as pump assembly 6 as follows). Water is shown flowing through the main inlet pipe 8, which is then routed through the various pipes 12a, 12b, through 12n as shown (referred to generically as pipe 12), which in turn are joined at outlet pipe 14. Thus, each pump 6a, 6b, through 6n will contribute to the system operation by pumping water through its respective adjoining pipe, 12a, 12b, through 12n.

Figure 2:
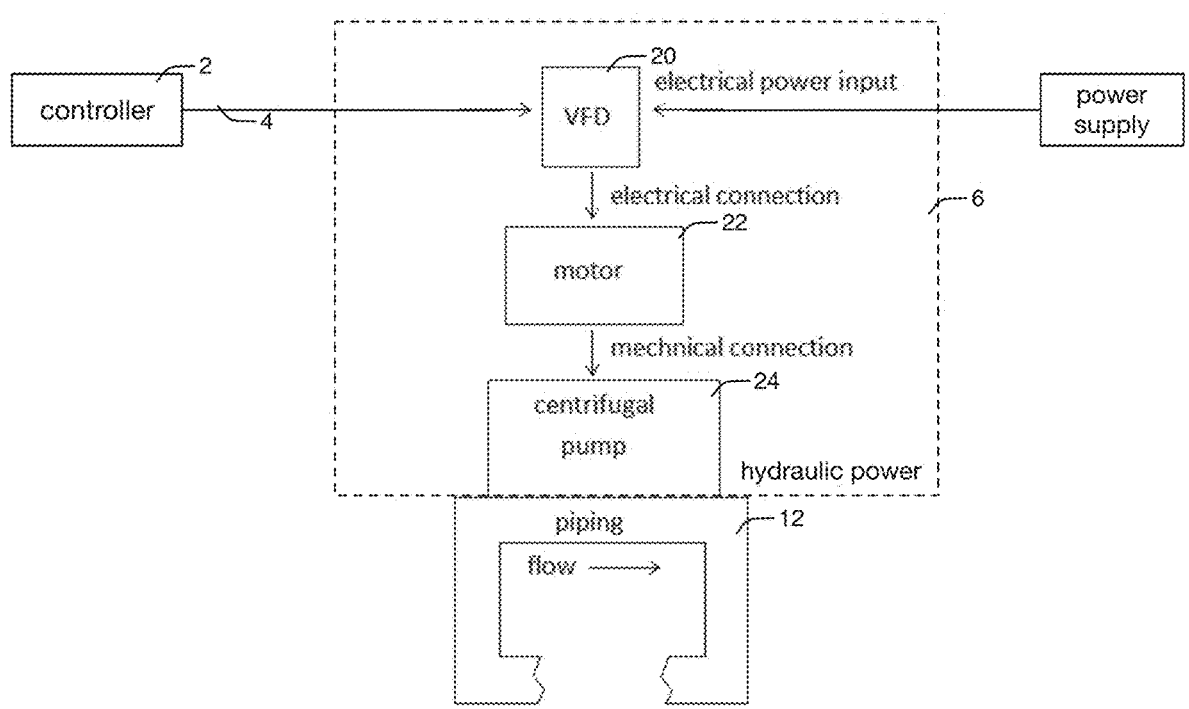
FIG. 2 is a block diagram of a pump assembly used in the preferred embodiment.

FIG. 2 is a block diagram of a pump assembly 6 used in the preferred embodiment. The pump assembly 6 includes a variable frequency drive (VFD) 20 electrically coupled to a motor 22, which in turn is mechanically coupled to a centrifugal pump 24 that provides the hydraulic power to the system. The controller 2 communicates electronically via the communication channel 4 with the multiple pump assemblies 6, in particular with the VFD 20 of each pump assembly 6. The controller 2 in the preferred embodiment consists of an electronic system with the ability to store and run a pre-specified program. This device is a programmable device such as a microprocessor, FPGA, DSP, and the like. Each VFD 20 has the ability to control the speed of the motor 22 to a desired value, by varying the frequency of the electric current supplied to the pump. The motor 22 is typically an AC induction motor or a permanent magnet motor. In turn, this motor 22 will control the centrifugal pump 24 that outputs hydraulic power in the form of flow and head as follows:

$$P = \frac{QHS}{3960}$$

where P is power in KW; H is head in ft; Q is flow in GPM; and S is the specific gravity.

The VFD 2 is programmed to send data back to the controller 2 that includes the amount of electric power being used, the speed of the motor 22, an estimation of flow, and an estimation of head. The pumps 24 will be configured in such a way that they operate in parallel to deliver the required amount of flow to the system. A very simplistic look at pumps in parallel, disregarding system constraints, is that flows will sum and head will average. The controller 2 is pre-programmed to run on a variable flow-head curve.

More specifically, the controller 2 requests from each of the pump assemblies 6 the flow, head, power and speed. The controller 2 takes the value of the flow from each of the pump assemblies 6 and sums them up as follows:

$$\text{Total Flow} = \sum_n \text{Individual Pump Flow}_i$$

$$\text{Total Power} = \sum_n \text{Individual Pump Power}_i$$

The controller 2 then calculates the desired head based on input parameters for each specific system 10. The system 10 will fluctuate the speed of the system to adjust for both flow and for pressure. The amount of adjustment is calculated using parameters entered by the user during the setup and the mode selected. Based on this result the controller 2 will determine a range of values for the desired system head. It then takes the head values it received from the pump assemblies 6 and calculates the system head:

$$\text{System Head} = \frac{1}{N} \sum_n \text{Individual head values}_i$$

If the system head is outside of the calculated head range then the controller 2 will speed up or slow down the pump assembly 6.

System Head Range Check=$\{x_c - \Delta x \leq x_s \leq x_c + \Delta x\}$ $x_c$, is the calculated head
$x_s$, is the system head.

In order to speed up or slow down the pump assembly 6, the controller 2 puts the error in the head through a PID controller that results in a change in speed value. This is then added to the current speed as communicated from the pump assemblies 6 and then the new speed value is communicated back to all pump assemblies 6. Even though all pump assemblies 6 receive the new speed signal, not all of the pump assemblies 6 may be running. The controller sends a different command that tells which pump assembly 6a, 6b, 6n to turn on or off depending on system demand. When the system 10 is running in a steady state it will calculate the head from the flow demand and set the speed of the pump assemblies 6. This will consume a certain amount of electrical power. As the pump assembly 6 speeds up, it will consume more power and it may become more efficient to run two pump assemblies (6a, 6b) at a lower speed rather than a single pump assembly 6a at a higher speed for the same amount of flow. This is due to the nature of centrifugal pumps and the dynamics of the hydraulic system. The controller will determine that point so it can be switched at the most efficient time, which is an iterative process that is continuously updating the controller.

The pump assembly 6 has the ability to communicate many parameters; some are actual readings and some are estimated. The parameters the user is interested in are flow and electrical power, the former being an estimation and the latter being an actual value. After a brief initialization and verification of parameters, the controller 2 will be ready to run. The user starts the controller 2 and the system starts the first pump assembly 6a that is designated as the lead pump. As the pump 24 of pump assembly 6a speeds up, the amount of electrical energy that is required increases. This can be seen in the graph of FIG. 3.

Figure 3:
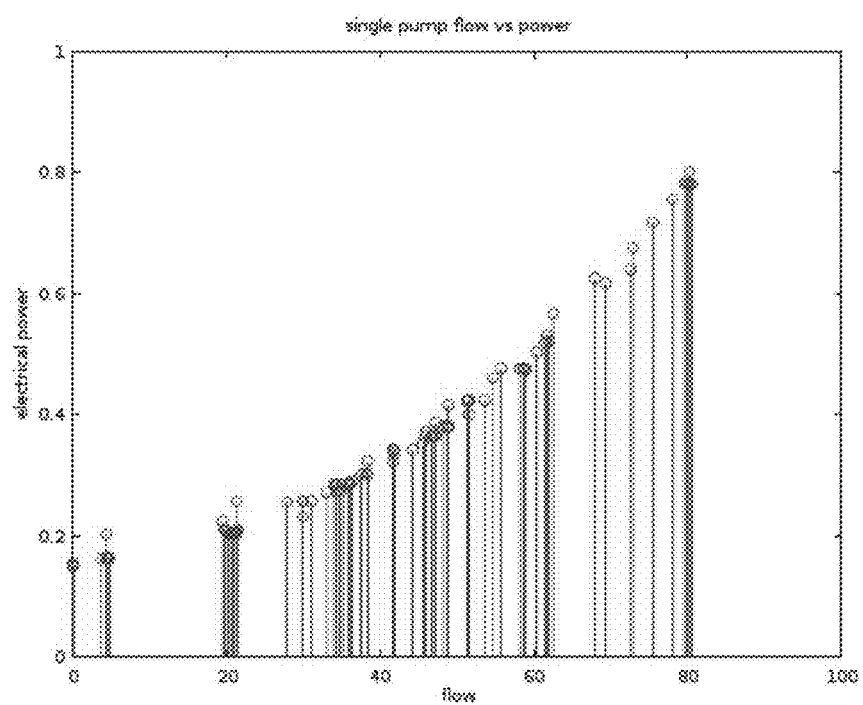
FIG. 3 is a graph of single pump flow vs. power.
Figure 4:
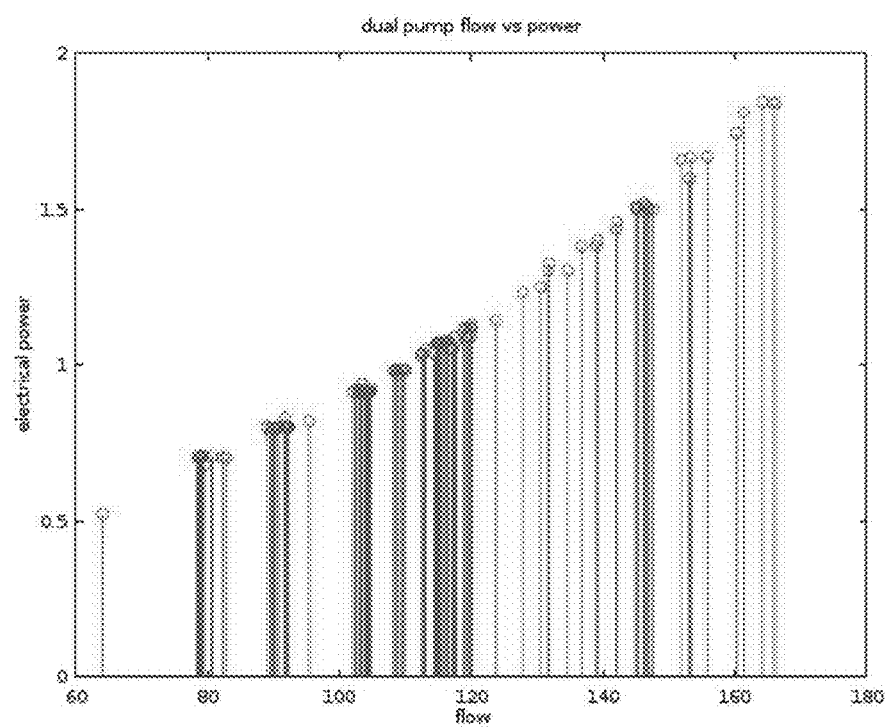
FIG. 4 is a graph of dual pump flow vs power.
Figure 5:
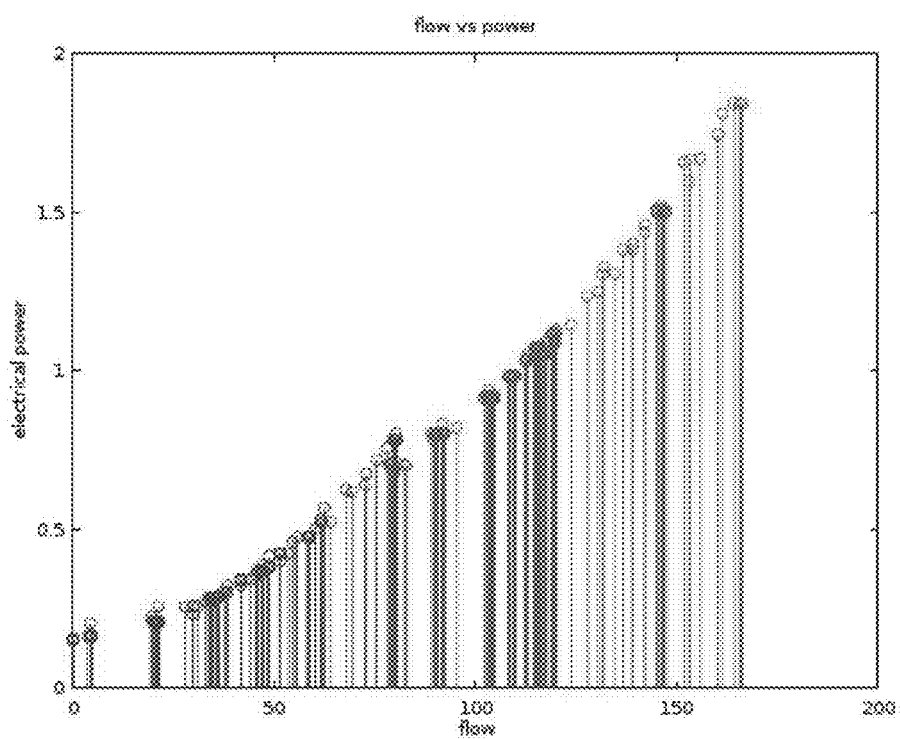
FIG. 5 is a graph that combines the graphs of FIG. 3 and FIG. 4.

Although the graph of FIG. 3 is a quadratic curve, it can be approximated in very small segments as a linear function. The same can be seen for two pump assemblies 6a, 6b running in parallel, as seen by the graph of in FIG. 4. This curve looks even more like a linear function, so a linear function will be a good approximation. FIG. 5 is a plot of both functions in the same graph.

Figure 6:
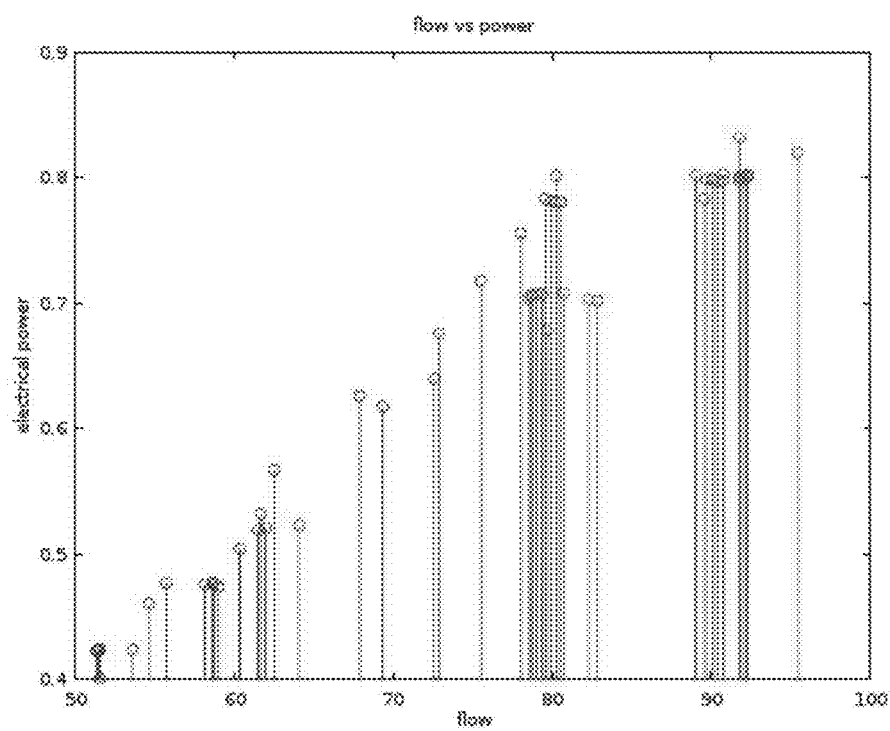
FIG. 6 is a close up view of FIG. 5 around the switching point.

FIG. 6 shows a close up view of the curve of FIG. 5 around the switching point; this shows in more detail the energy savings that could have been had if the system had switched from one pump to two pumps sooner. With a single pump assembly 6a running, the system flowing at 80 gpm takes around 0.8 horsepower; with two pump assemblies 6a, 6b running the same system takes 0.7 horsepower. In this example the switching speed could have been lowered to save this power. If the switching speed is chosen in such a way these two curves will meet, this will be the optimal switching speed. This is due to the fact that speed and flow are related by the pump affinity laws:

$$\frac{q_2}{q_1} = \frac{s_2}{s_1}$$

$q_x$ is the flow and $s_x$ is the speed.

We want the power of the lead pump assembly 6a to equal the power of the lead pump assembly 6a and the first lag pump assembly 6b at the switching point.

Power$_s$=Power$_m$

Power$_s$ is the power of a single pump at the switching point and Power$_m$ is the power of multiple pumps running at the switching point. So, bring the Power$_m$ over to the other side to yield the power difference equation.

Power$_s$−Power$_m$=0

However, when the pumps are switched, the flow is usually not the same so a linear approximation was made to estimate the power at the switching flow. Two approximations are made, one for the single pump and one for the multiple pumps. There are many well-known techniques for linear regression. The technique used for linear regression in this control methodology is the least squares approximation. The object of the least squares approximation is to find a linear predictor of flow (F) for a value of power (P). This will take the linear form:

$\hat{P}=aF+b$, where $\hat{P}$ is an estimate of $P$.

The minimum squared error mse$(a,b)=E_{F,P}[(P-\hat{P})^2]$, solving for $a$ and $b$ will yield $$\hat{P} = E_P[P] + \frac{\text{covariance}(F, P)}{\text{variance}(F)}(f - E_f[F]).$$

The controller 2 will then take the linear equations and solve for the flow where the powers are equal. The two powers are then put into the power difference equation to get an error. This error is then fed into some form of a Proportional, Integral, Derivative (PID) controller to determine the new switching speed to get the control difference.

Control difference=$K_p e[i]+K_I \Sigma e+K_d(e[i]-e[i-1])$, e is the error, $K_p$, $K_i$, $K_p$, are the proportional, integral(sum), and derivative gains. Each of the gains could be $-\infty < K_x < \infty$.

This control difference is then used to adjust the current switching flow. This procedure is then repeated every time the pump is turned on.

The same procedure would work when turning the pump off. The power and flow would be based on the power and flow of the multiple pumps right before switching off time, and the linear regression would be done on the single pump power and flow.

Though the above is based on a staging of just two pumps, the same would work with doing more pumps as long as only one pump is being staged on/off at any one time.

Results

Figure 7:
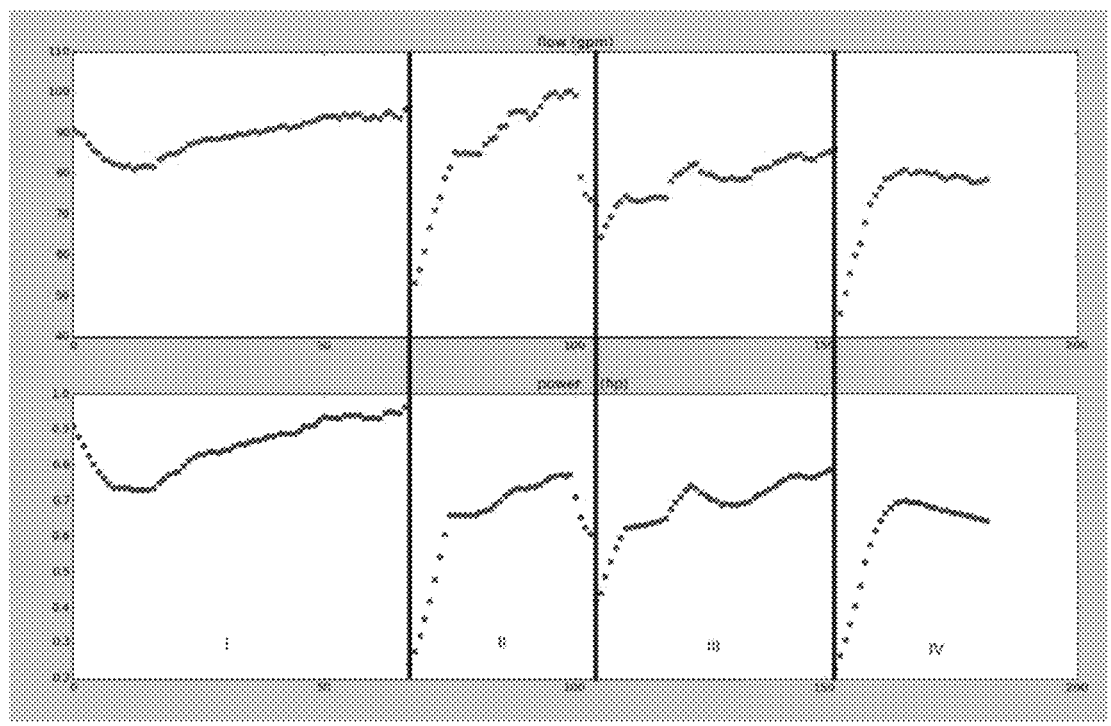
FIG. 7 illustrates flow and power for one and two pumps.
Figure 8:
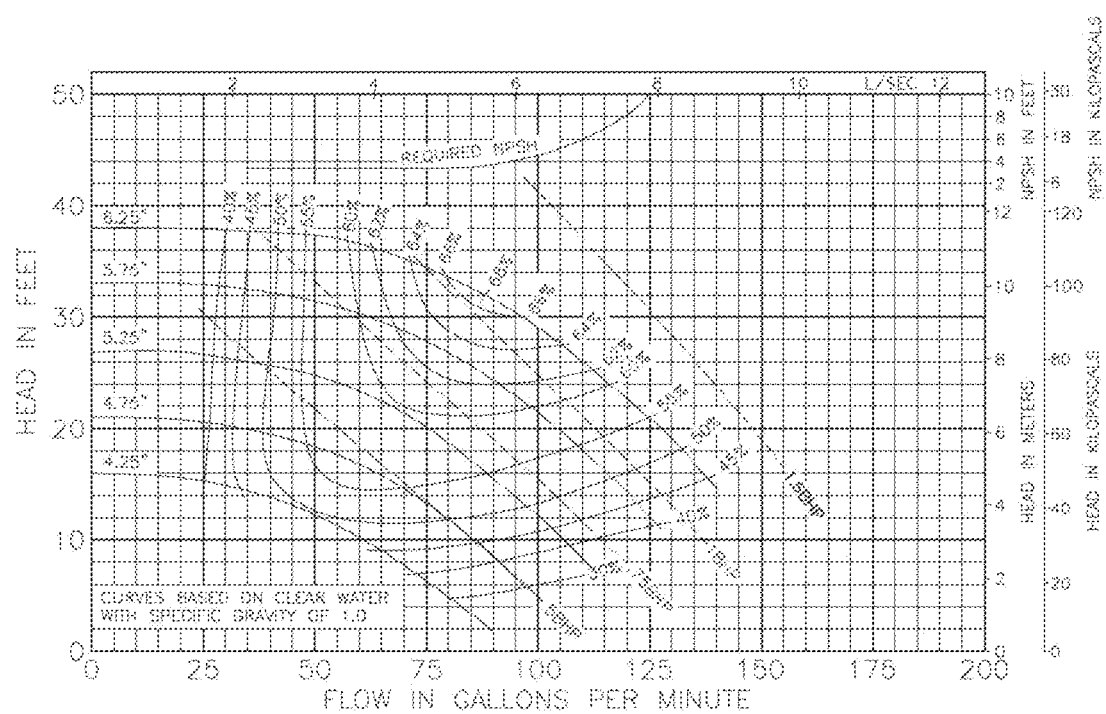
FIG. 8 is a pump curve chart, a graph of head vs. flow for a specific pump with various impeller sizes.

Reference is now made to FIG. 7, in which:
Zone I: One pump running
Zone II: Two pumps running
Zone III: One pump running
Zone IV: Two pumps running The previous figure, FIG. 7, has two graphs, in both graphs the horizontal axis is sample number. This sample number "n" can be thought of as time "t" of an arbitrary time interval "τ" therefore, t=nτ. The vertical axis for the top graph is flow in gallons per minute (gpm) and on the bottom graph is power in horsepower (hp). The data was taken from the VFD drives controlling the pumps. The power data is the power that is supplied by the VFD's to the pumps. The flow is the calculated flow determined by the VFD's sensor-less calculations. This system is comprised of two pumps with the pump curve shown in FIG. 8, using the 6.25-inch impeller.

These pumps are plumbed with 2-inch piping that then feeds a larger 4-inch loop. The flow can be controlled by adjusting a valve in the 4-inch loop 14, as the valve is opened the flow will increase, when the valve is closed the flow will decrease. Refer to the system description for a reference on the actual functioning of the controller. The figure depicted would be a typical example of the flow and the power curves as the system is adjusted. An increase in flow will result in an increase in power. In this example the correlation coefficient $$\rho = \frac{\text{covariance (flow, power)}}{\sqrt{\text{variance(flow)} \times \text{variance(power)}}}$$

is calculated to be 0.7927.

The system is initialized so the system will switch the second pump on when the first pump reaches its maximum speed, zone I. The pump is started, as the valve is opened in zone I the flow increases. The control increases the speed and the power required increases as a result. Data is being taken for flow, power, pressure and speed. The system is allowed to stabilize at various points near the maximum speed. When the system is very close to the maximum speed the valve is open just enough to force the control to turn on the second pump, zone II. The tandem pumps then come up to speed and stabilize to maintain a certain flow and pressure for the new system that now consists of two running pumps. The same data is taken and stored for the system with 2 pumps that was taken with a single pump. When enough data points are taken the linear regression was performed and the new switching point calculated. The valve was then turned to restrict flow and force the system to turn off the second pump. In zone III there is one pump running again and the same procedure is repeated in zones' III and IV.

It can be seen in the above figure that the power that was required to maintain the system for two pumps at the beginning of zone II was less than for a single pump at the end of zone I. Some of this is due to system dynamics and some due to motor efficiency. In this example, if the systems need to flow 90 gpm to maintain the system, it would be better to run two pumps then one. After the calculation of the new switching point in this example it switches it sooner as can be seen in the switch between zone III and zone IV. If this iterative process was to continuously repeat it would eventually determine the optimal switching point where for a given flow the amount of power to run two pumps is the same as one pump.

Figure 9:
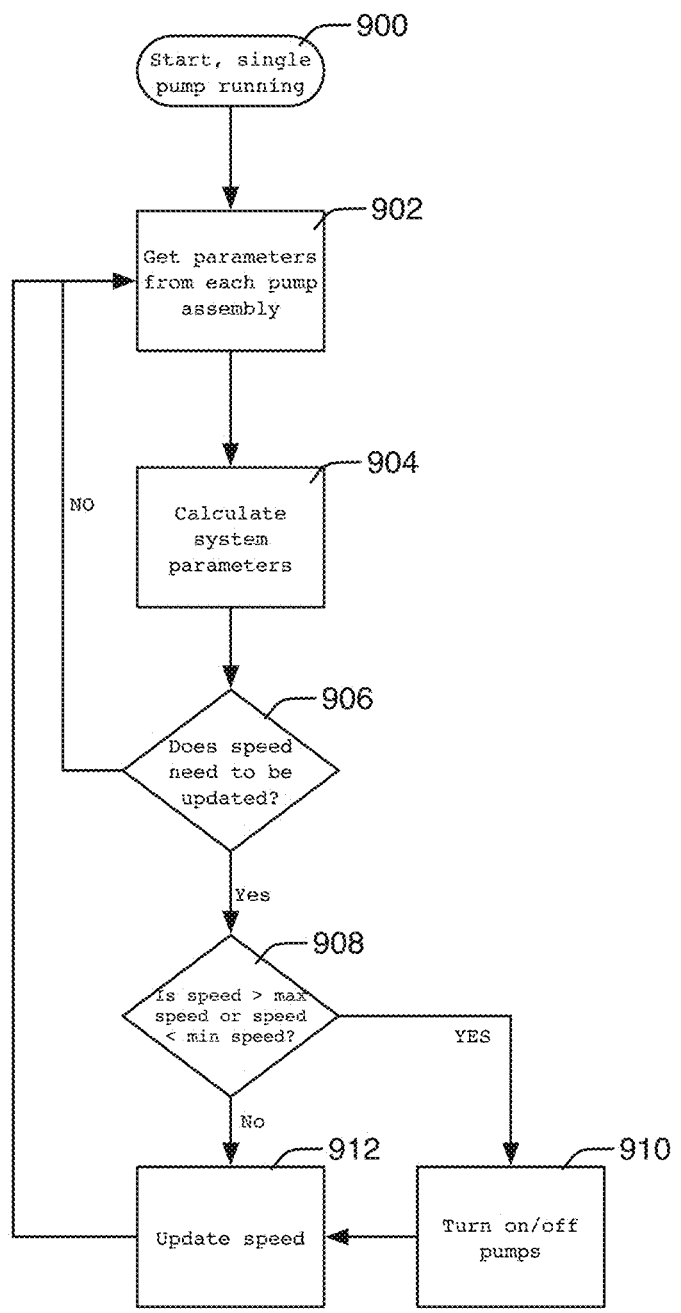
FIG. 9 is a flowchart of the operation of the preferred embodiment showing part of the decision in turning the pumps on and off.
Figure 10:
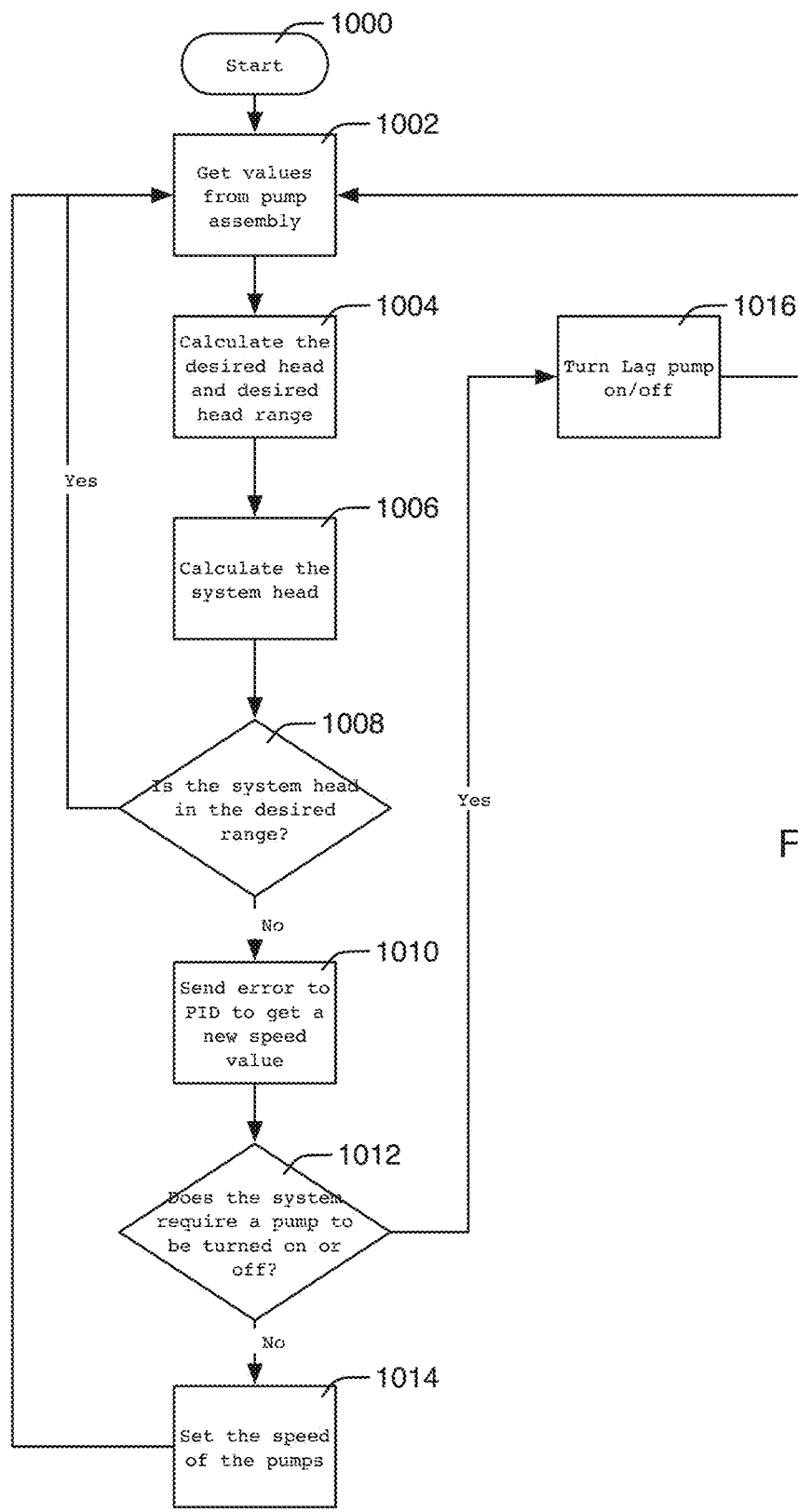
FIG. 10 is another flowchart of the operation of the preferred embodiment which is an overview of how the control loop works.
Figure 11:
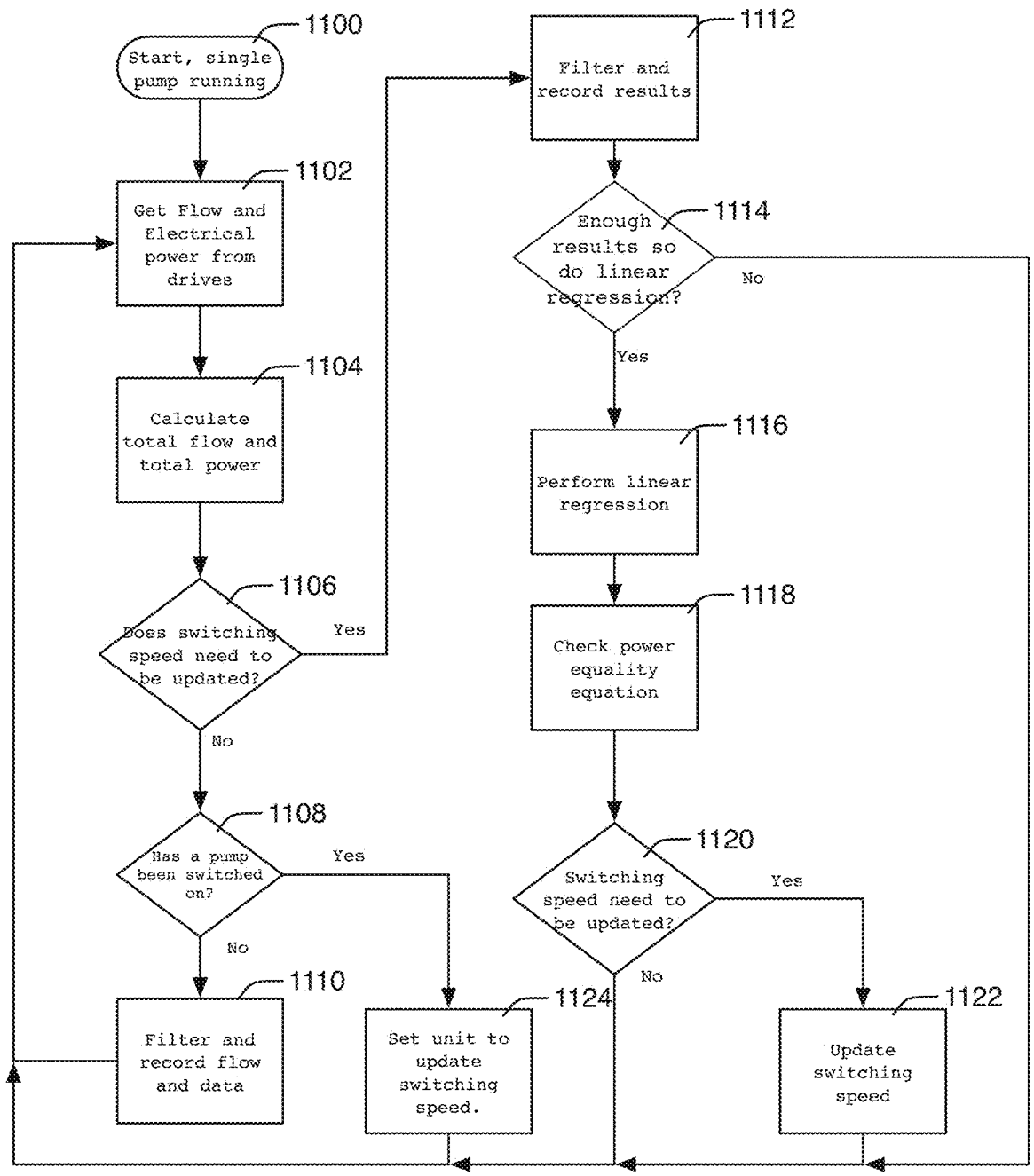
FIG. 11 is another flowchart of the operation of the preferred embodiment which is a flow chart for the algorithm of how the switching speed is calculated.

FIGS. 9-11 are flowcharts of various operations as described. FIG. 9 is a general overall flowchart of the operation of the preferred embodiment showing part of the decision in turning the pumps on and off. At step 900, the system starts with a single pump running. At step 902, the controller obtains the required parameters from each pump assembly, and at step 904 the system parameters are calculated. At step 906 it is determined if the speed needs to be updated. If NO, then the process loops back to step 902 and iterates until it is determined at step 906 that the speed needs to be updated. At YES, it is determined at step 908 if the speed is greater than maximum speed or less than the minimum speed. If NO, then the speed is updated at step 912 and the process loops back to step 902. If YES, then pumps are turned on/off at step 910.

FIG. 10 is another flowchart of the operation of the preferred embodiment which is an overview of how the control loop works. At step 1000, the process starts. At step 1002, values are obtained from the pump assembly. At step 1004, the desired head and range are calculated. At step 1006, the system head is calculated. At step 1008, it is determined if the system head is in the desired range. If "YES", then the process loops back to step 1002 and repeats until it is determined at step 1008 that the system head is not in the desired range. At "NO" at step 1008, the error is sent to the PID to get a new speed value at step 1010. At step 1012, it is determined if the system requires a pump to be turned on or off. If NO, then the process loops back to step 1002 and repeats until it is determined at step 1014 that the system requires a pump to be turned on or off. If YES, then the lag pump is turned on or off at step 1016 and the process begins again by looping to step 1002.

Generally, FIG. 10. Is the algorithm to determine at what speed the system should be set. It reads the head from the drives, calculates the system head then determines if the head is within the desired range then sets the speed. This flowchart is for just determining the speed of the pumps.

FIG. 11 is another flowchart of the operation of the preferred embodiment which is a flow chart for the algorithm of how the switching speed is calculated. More generally, FIG. 11 is the flowchart for the actual algorithm for how to determine the switching point for the pumps. At step 1100 the system starts with a single pump running. At step 1102, the flow and electrical power is obtained from the drives. At step 1104, the total flow and power are calculated. At step 1106, it is determined if the switching speed needs to be updated.

If it is determined at step 1106 that the switching speed does not need to be updated, then at NO it is determined if a pump has been switched on at step 1108. If NO, then step 1110 is executed to filter and record flow and data and the process loops back to step 702. If YES, then the unit is set to update the switching speed at step 1124 and the process loops back to step 1102.

If, however, it is determined at step 1106 that, "YES", the switching speed needs to be updated, then step 1112 is executed to filter and record results. At step 1114 it is determined if there are enough results to do a linear regression. If NO, then the process loops back to step 1102. If, however, it is determined at step 1114 that, "YES", there are enough results to do a linear regression, then at YES a linear progression is performed at step 1116. At step 1118 the power equality equation is checked, and at step 1120 it is determined if the switching speed needs to be updated.

If it is determined at step 1120 that the switching speed does not need to be updated, then at NO the process loops back to step 1102. If YES, then the switching speed is updated at step 1122 and the process loops back to step 1102.

Although the preferred embodiments have been described above by way of example only, it will be understood by those skilled in the art that modifications may be made to the disclosed embodiments without departing from the scope herein, in the claims below.

What is claimed is:

1. A hydraulic pumping system for pumping a flow of liquid comprising
   a. a main inlet pipe for supplying a flow of liquid;
   b. a plurality of feeder pipes branching from the main inlet pipe;
   c. a plurality of hydraulic pump assemblies, each of said pump assemblies being in operative fluid flow connection with a branching feeder pipe to control liquid flow through said associated feeder pipe, wherein each of the hydraulic pump assemblies comprises
   d. an electric motor,
   e. a variable frequency drive (VFD) electrically coupled to the motor, and
   f. a centrifugal pump mechanically coupled to the motor;
   g. a main outlet pipe in operative fluid flow connection with the plurality of feeder pipes for outputting the combined flow of liquid; and
   h. a controller electronically coupled via a communication channel to the VFD of each of the hydraulic pump assemblies, the controller comprising a programmable device programmed to control the speed of each of the motors via the connected VFD, as follows:
   i. to receive data from each of the VFDs, said data comprising the amount of electrical power consumed by the VFD, the speed of the associated motor, an estimation of liquid flow, and an estimation of head,
   j. to calculate the total aqueous liquid flow through the plurality of pump assemblies,
   k. and to calculate the total system head, and
   l. to vary the speed of each VFD to adjust the total system with respect to the desired system head.

2. The hydraulic pumping system of claim 1, wherein the liquid intended to be pumped is an aqueous liquid and wherein the hydraulic pumping system is intended to be installed in a multi-unit building having widely varying demand for the heating and cooling aqueous liquid, and designed to meet such widely varying requirements for the multi-unit building.

3. The hydraulic pumping system of claim 2, wherein the controller is programmed to carry out a linear regression to determine the correct time to change the number of operating pumps as the total liquid flow through the plurality of pump assemblies and the main outlet pipe changes, so as to maintain an improved electrical power efficiency for the desired total system head.

4. A method of automatically controlling, by a controller, a plurality of hydraulic pump assemblies to control the flow of liquid through an outlet pipe, each of said pump assemblies comprising a variable frequency drive (VFD) electrically coupled to a motor, the motor mechanically coupled to a centrifugal pump, said method comprising the steps of:
   a. the controller communicating with VFD for each of the plurality of pumps to control the speed of each of the motors via the connected VFD;
   b. the controller receiving data from each of the VFDs, said data comprising the amount of; electrical power consumed by the VFD, the speed of the associated motor, an estimation of aqueous liquid flow, and an estimation of head
   c. the controller calculating the total liquid flow from the plurality of pump assemblies;
   d. the controller calculating the total system head; and
   e. the controller being capable of varying the speed of each VFD to adjust the total system with respect to the desired combined system head in the outlet pipe.

5. The method of automatically controlling a plurality of hydraulic pump assemblies to control the flow of aqueous liquid through a pipe, in accordance with claim 4, wherein the liquid intended to be pumped is an aqueous liquid and wherein the hydraulic pumping system is intended to be installed in a multi-unit building having widely varying demand for the heating and cooling aqueous liquid, as indicated by a change in the combined flow through the main outlet pipe.

6. The method of automatically controlling a plurality of hydraulic pump assemblies to control the flow of a liquid through a pipe of claim 5, wherein as the combined total flow through the main outlet pipe changes the controller calculates, utilizing linear regression the correct time to change the number of operating pump assemblies to maintain an improved electrical power efficiency for the desired total system head.

* * * * *